United States Patent
Park et al.

(10) Patent No.: US 8,013,060 B2
(45) Date of Patent: Sep. 6, 2011

(54) METHOD FOR CONCENTRATING ORGANIC SILICATE POLYMER SOLUTION

(75) Inventors: Jong-suh Park, Gongju-si (KR); Sun-hyuk Choi, Daejeon (KR); Ji-ho Yoon, Daejeon (KR); Jung-uk Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 428 days.

(21) Appl. No.: 11/920,858

(22) PCT Filed: May 23, 2006

(86) PCT No.: PCT/KR2006/001933
§ 371 (c)(1), (2), (4) Date: May 5, 2009

(87) PCT Pub. No.: WO2006/126824
PCT Pub. Date: Nov. 30, 2006

(65) Prior Publication Data
US 2010/0130683 A1    May 27, 2010

(30) Foreign Application Priority Data
May 23, 2005    (KR) .................. 10-2005-0042981

(51) Int. Cl.
*C08L 83/06* (2006.01)
(52) U.S. Cl. ...................................... 524/860
(58) Field of Classification Search ............ 524/860
See application file for complete search history.

(56) References Cited

U.S. PATENT DOCUMENTS

| | | | | |
|---|---|---|---|---|
| 3,428,530 A | * | 2/1969 | Fauche et al. | 203/72 |
| 3,792,012 A | * | 2/1974 | Zdaniewski | 523/213 |
| 4,242,252 A | * | 12/1980 | Newing | 524/718 |
| 4,609,752 A | * | 9/1986 | Giesing et al. | 556/457 |
| 4,857,582 A | * | 8/1989 | Wolfgruber et al. | 524/730 |
| 5,281,657 A | * | 1/1994 | Mautner et al. | 524/745 |
| 5,561,209 A | | 10/1996 | Pieschnick et al. | |
| 6,015,457 A | | 1/2000 | Leung et al. | |
| 6,054,548 A | * | 4/2000 | Currie et al. | 528/23 |
| 6,069,220 A | * | 5/2000 | Hoffmann et al. | 528/12 |
| 6,121,368 A | * | 9/2000 | Heying et al. | 524/493 |

(Continued)

FOREIGN PATENT DOCUMENTS
DE    04212752    10/1993

(Continued)

OTHER PUBLICATIONS

Glover et al. "Evaporation of Difficult Products" Reprint from the Feb. 1997 edition of Chemical Processing, 4 pages.*

(Continued)

*Primary Examiner* — Robert Loewe
(74) *Attorney, Agent, or Firm* — McKenna Long & Aldridge LLP

(57) ABSTRACT

The present invention relates to a method for concentrating organic silicate polymer solution, and more precisely, a method for concentrating organic silicate polymer solution by distillation which is characterized by remarkably reduced distillation time realized by the short-term continuous distillation at low temperature under low pressure, minimized physical property changes attributed to the inhibition of the heat-induced reaction by making the solution pass through the thin film evaporator shortly, concentration without cake generation, and easy manipulation with high capacity, making the method highly economical.

5 Claims, 1 Drawing Sheet

U.S. PATENT DOCUMENTS

| | | |
|---|---|---|
| 6,184,330 B1 | 2/2001 | Currie et al. |
| 6,451,436 B1 * | 9/2002 | Komatsu et al. .............. 428/447 |
| 6,545,122 B1 | 4/2003 | Elsner |
| 6,787,191 B2 * | 9/2004 | Hanahata et al. ............. 427/387 |

FOREIGN PATENT DOCUMENTS

| | | |
|---|---|---|
| JP | 04-198321 | 7/1992 |
| JP | 2000-309636 | 11/2000 |

OTHER PUBLICATIONS

Machine generated English-language translation of DE_4212752, made using Google translate, translation generated on Feb. 2011, 4 pages.*

* cited by examiner

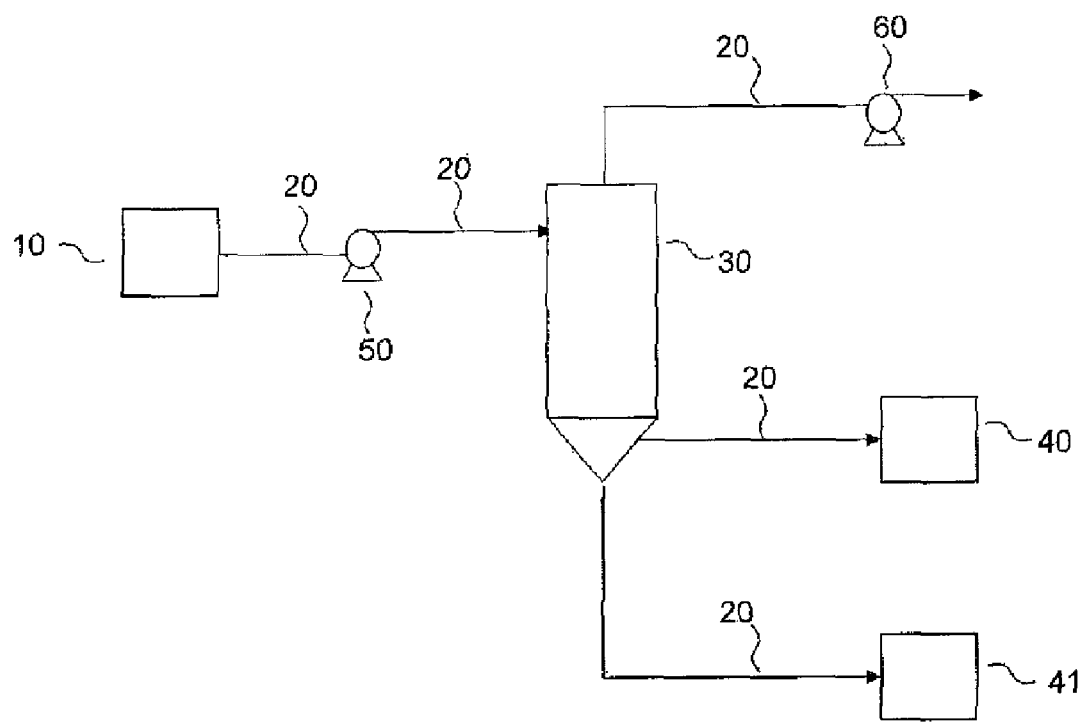
[Fig. 1]

METHOD FOR CONCENTRATING ORGANIC SILICATE POLYMER SOLUTION

This application claims priority to Korean Application No. 10-2005-0042981 filed on May 23, 2005, which is incorporated by reference, as if fully set forth herein.

TECHNICAL FIELD

The present invention relates to a method for concentrating organic silicate polymer solution, and more precisely, a method for concentrating organic silicate polymer solution which is characterized by remarkably shortened distillation time realized by the short-term continuous distillation under low pressure at low temperature, minimum property changes of silicate polymer solution by minimizing the reaction of thermal activation by reducing the passing time through a thin film evaporator, effective concentration without cake generation, and easy manipulation with a large capacity.

BACKGROUND ART

To concentrate a solution, a completely stirred tank reactor (CSTR) has generally been used. However, the CSTR has the disadvantages of long distillation time attributed to the reduced heat transfer area per unit volume as the device becomes bigger, and a never ending reaction.

U.S. Pat. No. 6,015,457 describes a method for concentrating organic silicate polymer by using a rotary evaporator. Even with this method, the problem of long distillation time still remains unsolved.

Therefore, to overcome the above mentioned problem, the present invention provides a method for concentrating organic silicate polymer solution which is characterized by remarkably shortened distillation time realized by the short-term continuous distillation under low pressure at low temperature, minimum property changes of the silicate polymer solution resulting from the minimization of the reaction of thermal activation by reducing the passing time of the silicate polymer solution through a thin film evaporator, effective concentration without cake generation, and easy manipulation with a large capacity.

DISCLOSURE OF INVENTION

Technical Problem

An object of the present invention is to provide a method for concentrating organic silicate polymer solution which is characterized by remarkably shortened distillation time realized by the short-term continuous distillation under low pressure at low temperature, minimum property changes of silicate polymer solution by minimizing the reaction of thermal activation by reducing the passing time through a thin film evaporator, effective concentration without cake generation, and easy manipulation with a large capacity.

TECHNICAL SOLUTION

To achieve the above object, the present invention provides a method for concentrating silicate polymer solution, which includes the step of concentrating silicate polymer solution by distilling the solution using a thin film evaporator.

BRIEF DESCRIPTION OF THE DRAWINGS

The above and other objects, features and advantages of the present invention will become apparent from the following description of preferred embodiments given in conjunction with the accompanying drawings, in which:

FIG. 1 is a schematic diagram illustrating a device for concentrating the organic silicate polymer solution of the invention.

10: Organic silicate polymer solution repository
20: Pipes 30: Thin film evaporator
40: Distillate repository
41: Repository for the concentrated organic silicate polymer solution
50: Metering pump 60: Vacuum pump

BEST MODE FOR CARRYING OUT THE INVENTION

Hereinafter, the embodiments of the present invention will be described in detail.

The concentration method of the present invention is characterized by including the step of distilling organic silicate polymer solution by using a thin film evaporator.

The organic silicate polymer used in the present invention can be prepared by hydrolyzing a silane compound with water and a catalyst in the presence of an organic solvent or as a bulk, followed by a condensation reaction.

The silane compound can be one of, or a mixture of, the compounds represented by the following Formula 1, Formula 2 and Formula 3.

$$SiR^1_p R^2_{4-p} \quad \text{[Formula 1]}$$

Wherein,
$R^1$ is independently H, F, aryl, vinyl, allyl, or unsubstituted or F-substituted $C_1$-$C_4$ straight or branched alkyl,
$R^2$ is independently acetoxy, hydroxy, or $C_1$-$C_4$ straight or branched alkoxy, P is an integer from 0-2.

$$R^3_q R^4_{3-q} Si\text{-}M\text{-}SiR^5_r R^6_{3-r} \quad \text{[Formula 2]}$$

Wherein,
$R^3$ and $R^5$ are independently H, F, aryl, vinyl, allyl, or unsubstituted or F-substituted $C_1$-$C_4$ straight or branched alkyl,
$R^4$ and $R^6$ are independently acetoxy, hydroxy, or $C_1$-$C_4$ straight or branched alkoxy,
M is $C_1$-$C_3$ alkylene or phenylene,
q and r are independently integers from 0-2.

$$R^7_n[SiO]_m R^8_{2m-n} \quad \text{[Formula 3]}$$

Wherein,
$R^7$ is independently H, F, aryl, vinyl, allyl, or unsubstituted or F-substituted $C_1$-$C_4$ straight or branched alkyl,
$R^8$ is independently alkoxy, hydroxy, or

$$-(CH_2)_a SiR^9_b R^{10}_{3-b}$$

($R^9$ is independently H, F, aryl, vinyl, allyl, or unsubstituted or F-substituted $C_1$-$C_4$ straight or branched alkyl, $R^{10}$ is acetoxy, hydroxy, or unsubstituted or F-substituted $C_1$-$C_4$ straight or branched alkoxy, a is an integer from 1-6, and b is an integer from 0-2), n and m are independently integers from 3-10.

When two or more silane compounds are mixed, the mixing order is not fixed. The total amount of every compound can be mixed together from the beginning, followed by hydrolysis and condensation. Alternatively, part of the total amount of each compound can be mixed first, and after increasing their molecular weights by hydrolysis and condensation, the remaining amount of each compound can be added, followed by additional hydrolysis and condensation.

The organic solvent used herein is not limited to a specific one as long as a silane compound and a catalyst can be mixed properly therein or hydrolysis and concentration are not disturbed under phase separation state. In particular, the organic solvent can be exemplified by aliphatic hydrocarbon solvents such as n-pentane, pentane, n-hexane, i-hexane, 2,2,4-trimethylpentane, cyclohexane or methylcyclohexane; aromatic hydrocarbon solvents such as benzene, toluene, xylene, trimethylbenzene, ethylbenzene or methylethylbenzene; alcohol solvents such as methylalcohol, ethylalcohol, n-propanol, i-propanol, n-butanol, i-butanol, sec-butanol, t-butanol, 4-methyl-2-pentanol, cyclohexanol, methylcyclohexanol or glycerol; ketone solvents such as acetone, methylethylketone, methyl-n-propylketone, methyl-n-butylketone, methyl-1-butylketone, diethylketone, cyclohexanone, methylcyclohexanone or acetylacetone; ether solvents such as tetrahydropurane, 2-methyl tetrahydropurane, ethylether, n-propylether, i-propylether, n-butylether, diglyme, dioxin, dimethyldioxin, ethyleneglycolmonomethylether, ethyleneglycolmonoethylether, ethyleneglycol-n-propylether, ethyleneglycoldimethylether, ethyleneglycoldiethylether, propyleneglycolmonomethylether, propyleneglycolmonoethylether, propyleneglycoldimethylether, propyleneglycoldiethylether or propyleneglycoldipropylether; ester solvents such as diethylcarbonate, methylacetate, ethylacetate, n-propylacetate, i-propylacetate, n-butylacetate, ethyllactate, ethyleneglycolmonomethyletheracetate, ethyleneglycolmonoethyletheracetate, propyleneglycolmonomethyletheracetate, propyleneglycolmonoethyletheracetate, propyleneglycolmonopropyletheracetate, ethyleneglycoldiacetate or propyleneglycoldiacetate; and amide solvents such as N-methylpyrrolidone, formamide, N-methylformamide, N-ethylformamide, N,N-dimethylformamide, N,N-diethylformamide, N-methylacetamide, N-ethylacetamide, N,N-dimethylacetamide or N,N-diethylacetamide.

It is preferable to use a catalyst in the present invention to promote hydrolysis and condensation. The catalyst used for hydrolysis and condensation is preferably an acid catalyst or a base catalyst.

For the best mode of using the catalyst, a composition can be hydrolyzed and condensed serially by using an acid catalyst or a base catalyst. For example, a composition is hydrolyzed and condensed by using an acid catalyst first and then reacted with a base catalyst or vice-versa. It is also possible to react the composition using an acid catalyst and a base catalyst respectively and then two condensates are mixed for further reaction.

According to an exemplary embodiment of the invention, water is added for hydrolysis of a silane compound.

The preferable temperature for hydrolysis and condensation herein is 0-120° C., but not always limited thereto.

To prepare the organic silicate polymer, water and a catalyst are added to a silane compound in the presence of an organic solvent or as a bulk, followed by hydrolysis and condensation. It is preferable to add an organic solvent to the organic silicate polymer prepared as a bulk to dissolve the polymer completely in the solution. At this time, the organic solvent can be any one of those solvents available for the production of organic silicate polymer.

The organic silicate polymer solution preferably contains 1-70 weight % of organic silicate polymer and 30-99 weight % of organic solvent, more preferably includes 2-30 weight % of organic silicate polymer and 70-98 weight % of organic solvent.

The prepared organic silicate polymer solution is distilled in a thin film evaporator and then condensed.

Any device that has a thin film within an evaporator can be used as a thin film evaporator for the invention. For example, an agitated thin film evaporator, a long tube vertical evaporator and a falling film evaporator, which are classified by the way of forming a thin film within an evaporator, are all available. An agitated thin film evaporator has a rotary blade inside to form a thin film, as opposed to a long tube vertical evaporator and a falling film evaporator, which are devices that form a thin film depending on gravity.

In the case of using a thin film evaporator, it is preferred to perform the distillation under 0.001 torr-normal pressure and more preferred to perform the distillation under a pressure of 0.01-500 torr. It is most preferred to perform the distillation under a low pressure of 1-200 torr.

The temperature for distillation depends on the pressure but a low temperature of 0-100° C. is preferred and 5-70° C. is more preferred.

The distillation using the above thin film evaporator is generally done once but if necessary it can be done more than once.

The resultant organic silicate polymer solution distilled and concentrated as the above can contain the organic silicate polymer at up to 70%.

The method for concentrating the silicate polymer solution of the present invention will be described in detail with reference to the accompanying drawings.

FIG. 1 is a schematic diagram illustrating a device for concentrating the organic silicate polymer solution of the present invention. The concentrating device of FIG. 1 is composed of a repository (10) for the organic silicate polymer solution; a thin film evaporator (30) for concentrating the organic silicate polymer solution; a distillate repository (40) for the storage of the product distilled through the thin film evaporator; a repository (41) for the concentrated organic silicate polymer solution; a metering pump (50) for providing the organic silicate polymer solution serially to the thin film evaporator; a vacuum pump (60); and pipes for the transportation of the product to each element.

Particularly, concentration using the above concentrating device is performed as follows; the organic silicate polymer solution prepared in a completely stirred tank reactor is stored in the organic silicate polymer solution repository (10), then the temperature of the jacket of the thin film evaporator (30) is maintained without change and the pressure is regulated by the vacuum pump (60). When the desired pressure is obtained, the organic silicate polymer solution stored in the organic silicate polymer solution repository (10) is provided regularly to the thin film evaporator (30) through pipes (20) by using the metering pump (50), then a rotary blade starts rotating to form a thin film inside the wall of the thin film evaporator (30) to distill the provided organic silicate polymer solution. At this time, sampling is not performed during the early stage of operating since the early stage of driving is considered to be unstable or incomplete. Only subsidiary samples are taken during the early operation and when the processes are considered to be progressing normally, distilled product is transported through pipes (20) to the distillate repository (40) and the concentrated organic silicate polymer solution is transported to the organic silicate polymer solution repository (41). Then, samples are serially obtained therefrom.

The organic silicate polymer solution concentrated by the method described above can be included in a composition for forming the insulating layer of semi-conductor device, a composition for a thin film, or a composition for multiple coating solutions.

According to the present invention, the distillation time can be surprisingly reduced by short-term continuous distillation under low pressure and low temperature. In addition, physical property changes of the organic silicate polymer solution can be minimized by inhibiting the reaction by heat by passing the solution through the thin film evaporator quickly, a cake is not generated, and making the concentration effective and easy manipulation with a high capacity are the other advantages of the method of the present invention. Therefore, the method of the present invention enables effective concentration of organic silicate polymer solution.

Practical and presently preferred embodiments of the present invention are illustrated in the following examples.

However, it will be appreciated that those skilled in the art, on consideration of this disclosure, may make modifications and improvements within the spirit and scope of the present invention.

EXAMPLES

Example 1

Preparation of Organic Silicate Polymer Solution

To a 3 L glass CSTR equipped with a cooler were added 250 g of methyltritoxysilane and 140 g of tetramethoxysilane at room temperature. Then, 900 g of 0.01 N aqueous nitric acid and 900 g of propyleneglycolmethylether acetate (PMAc) were added thereto. The jacket temperature of the CSTR was maintained at 60° C., and the reaction was induced for about 20 hours to prepare organic silicate polymer solution containing 8% of organic silicate polymer.
(Concentration of Organic Silicate Polymer Solution)

1195.g of the organic silicate polymer solution prepared as above was put in the organic silicate polymer solution repository, then the pressure therein was maintained at 30 mbar by using the vacuum pump and the jacket temperature of the thin film evaporator was maintained at 36±2° C. by using a temperature controller. The organic silicate polymer solution stored in the repository was continuously provided through a supply pump to the thin film evaporator at a flow rate of 40 g/min. The volatile matter content produced from the distillation was cooled down in the cooler equipped in the thin film evaporator and then transported to the distillate repository at lower than room temperature, at a flow rate of 26 g/min. The organic silicate polymer solution concentrate containing organic silicate polymer, a non-volatile matter, was transported to the concentrated organic silicate polymer solution repository at a flow rate of 14 g/min. At that time, the rotating frequency of the rotary blade was regulated to be 150 rpm.

Example 2

256.g of the organic silicate polymer solution prepared as in the above Example 1 was put in the organic silicate polymer solution repository, then the pressure therein was maintained at 20 mbar by using the vacuum pump and the jacket temperature of the thin film evaporator was maintained at 30±2° C. by using a temperature controller. The organic silicate polymer solution stored in the repository was continuously provided through a supply pump to the thin film evaporator at a flow rate of 53 g/min. The volatile matter content produced from the distillation was cooled down in the cooler equipped in the thin film evaporator and then transported to the distillate repository at lower than room temperature at a flow rate of 28 g/min. The organic silicate polymer solution concentrate containing organic silicate polymer, a non-volatile matter, was transported to the concentrated organic silicate polymer solution repository at a flow rate of 25 g/min. At that time, the rotating frequency of the rotary blade was regulated to be 150 rpm.

Example 3

Preparation of Organic Silicate Polymer Solution

To a 10 L glass CSTR equipped with a cooler were added 1000 g of methyltrimethoxysilane and 559 g of tetramethoxysilane at room temperature. Then, 3600 g of 0.01 N aqueous nitric acid and 3600 g of PMAc were added thereto. The jacket temperature of the CSTR was maintained at 60?C., and the reaction was induced for about 20 hours to prepare organic silicate polymer solution containing 8% of organic silicate polymer.
(Concentration of Organic Silicate Polymer Solution)

4690.g of the organic silicate polymer solution prepared as the above was put in the organic silicate polymer solution repository, then the pressure therein was maintained at 25 mbar by using the vacuum pump and the jacket temperature of the thin film evaporator was maintained at 35±2° C. by using a temperature controller. The organic silicate polymer solution stored in the repository was continuously provided through a supply pump to the thin film evaporator at a flow rate of 53.3 g/min. The volatile matter content produced from the distillation was cooled down in the cooler equipped in the thin film evaporator and then transported to the distillate repository at lower than room temperature at a flow rate of 30 g/min. The organic silicate polymer solution concentrate containing organic silicate polymer, a non-volatile matter, was transported to the concentrated organic silicate polymer solution repository at a flow rate of 23.3 g/min. At that time, the rotating frequency of the rotary blade was regulated to be 150 rpm.

Example 4

8000.g of the organic silicate polymer solution prepared as in the above Example 3 was put in the organic silicate polymer solution repository, then the pressure therein was maintained at 26 mbar by using the vacuum pump and the jacket temperature of the thin film evaporator was maintained at 33±2° C. by using a temperature controller. The organic silicate polymer solution stored in the repository was continuously provided through a supply pump to the thin film evaporator at a flow rate of 48.3 g/min. The volatile matter content produced from the distillation was cooled down in the cooler equipped in the thin film evaporator and then transported to the distillate repository at lower than room temperature at a flow rate of 27.3 g/min. The organic silicate polymer solution concentrate containing organic silicate polymer, a non-volatile matter, was transported to the concentrated organic silicate polymer solution repository at a flow rate of 21 g/min. At that time, the rotating frequency of the rotary blade was regulated to be 150 rpm.

Example 5

Concentration of Organic Silicate Polymer Solution 1040.g of the organic silicate polymer solution concentrate containing organic silicate polymer, a non-volatile matter, primarily concentrated as in Example 3, was provided to the thin film evaporator at a flow rate of 80 g/min, during which the pressure was maintained at 20 mbar and the jacket temperature of the thin film evaporator was maintained at 28±2° C. by using a temperature controller, leading to the secondary concentration. The volatile matter content produced from the distillation was cooled down in the cooler equipped in the thin film evaporator and then transported to the distillate repository at lower than room temperature at a flow rate of 17 g/min. The organic silicate polymer solution concentrate containing organic silicate polymer, a non-volatile matter, was transported to the concentrated organic silicate polymer solution repository at a flow rate of 63 g/min. At that time, the rotating frequency of the rotary blade was regulated to be 150 rpm.

Example 6

Concentration of Organic Silicate Polymer Solution 2250.g of the organic silicate polymer solution concentrate containing organic silicate polymer, a non-volatile matter, primarily concentrated as in Example 4, was provided to the thin film evaporator at a flow rate of 75 g/min, during which the pressure was maintained at 20 mbar and the jacket temperature of the thin film evaporator was maintained at 31±2° C. by using a temperature controller, leading to the secondary concentration.

The volatile matter content produced from the distillation was cooled down in the cooler equipped in the thin film evaporator and then transported to the distillate repository at lower than room temperature at a flow rate of 21 g/min. The organic silicate polymer solution concentrate containing organic silicate polymer, a non-volatile matter, was transported to the concentrated organic silicate polymer solution repository at a flow rate of 54 g/min. At that time, the rotating frequency of the rotary blade was regulated to be 150 rpm.

Comparative Example 1

Preparation of Organic Silicate Polymer Solution

To a 1 L glass CSTR equipped with a cooler were added 100 g of methyltrimethoxysilane and 56 g of tetramethoxysilane at room temperature. Then, 360 g of 0.01 N aqueous nitric acid and 360 g of PMAc were added thereto. The jacket temperature of the CSTR was maintained at 60° C., and the reaction was induced for about 20 hours to prepare organic silicate polymer solution containing 8% of organic silicate polymer.
(Concentration of Organic Silicate Polymer Solution)
To a 1 L glass CSTR was added 876 g of the organic silicate polymer solution prepared as the above, followed by batch distillation at a jacket temperature of 46° C. while reducing the pressure slowly from 150 mbar to 60 mbar.

Comparative Example 2

Concentration of Organic Silicate Polymer Solution

To a 10 L glass CSTR was added 8759 g of the organic silicate polymer solution prepared as in Example 3, followed by batch distillation at a jacket temperature of 36° C. while reducing the pressure slowly from 60 mbar to 20 mbar.

Comparative Example 3

Concentration of Organic Silicate Polymer Solution

To a 2 L glass rotary evaporator was added 873 g of the organic silicate polymer solution primarily concentrated in Comparative Example 1, followed by batch distillation, leading to the secondary concentration. The pressure was reduced from 55 mbar at the beginning to 5 mbar and the temperature of the water bath was maintained at 35° C. to heat the evaporator.

Comparative Example 4

Concentration of Organic Silicate Polymer Solution

To a 3 L CSTR was added 2983 g of the organic silicate polymer solution containing the non-volatile organic silicate polymer primarily concentrated in Comparative Example 2, followed by batch distillation for the secondary concentration. The jacket temperature of the CSTR was maintained at 31° C. and the pressure was reduced from 45 mbar to 20 mbar for the distillation.

Weight average molecular weight (Mw), molecular weight distribution (PDI), content of organic silicate polymer (TSC) and distillation capacity of the concentrated organic silicate polymer solutions prepared in Examples 1-6 and Comparative Examples 1-4 were measured before and after the distillation as follows, and the results are shown in Table 1.
  a) Mw and PDI—measured by gel chromatography
  b) Content of organic silicate polymer—After sampling the organic silicate polymer solution, the organic silicate polymer included in the solution was eliminated by nonsolvent treatment. Then, the solvent included in the organic silicate polymer solution was measured by gas chromatography and water content was measured by using Karl Fisher. Finally, the content of organic silicate polymer was calculated and presented as weight percentage.

TABLE 1

|  |  | Example | | | | | | Comparative Example | | | |
| --- | --- | --- | --- | --- | --- | --- | --- | --- | --- | --- | --- |
|  |  | 1 | 2 | 3 | 4 | 5 | 6 | 1 | 2 | 3 | 4 |
| Jacket Temp (° C.) |  | 36 | 31 | 35 | 34 | 29 | 31 | 46 | 36 | 35 | 31 |
| Before | Mw | 2,030 | 2,030 | 1,820 | 1,750 | 1,960 | 1,900 | 1,800 | 2,072 | 1,920 | 2,230 |
| Distillation | PDI | 1.83 | 1.83 | 1.70 | 1.77 | 1.72 | 1.68 | 1.68 | 1.85 | 1.78 | 1.77 |
|  | TSC | 8 | 8 | 8 | 8 | 25 | 24 | 8 | 8 | 8 | 24 |
| After | Mw | 2,250 | 2,180 | 1,960 | 1,900 | 2,090 | 2,190 | 2,310 | 2,230 | 2,420 | 2,310 |
| Distillation | PDI | 1.72 | 1.72 | 1.72 | 1.68 | 1.79 | 1.78 | 1.72 | 1.77 | 1.81 | 1.84 |
|  | TSC | 33 | 24 | 25 | 24 | 32 | 33 | 24 | 24 | 38 | 35 |
| Distillation Capacity (kg/m²h) |  | 21.7 | 29.0 | 29.1 | 26.3 | 43.6 | 40.9 | 9.5 | 6.3 | 5.4 | 7.8 |

As shown in Table 1, molecular weight changes, before and after distillation, of the organic silicate polymer solutions concentrated by using a thin film evaporator in Examples 1-4 were similar with those of the organic silicate polymer solutions concentrated by using a CSTR in Comparative Examples 1-4. From the comparison of distillation capacity, it was confirmed that the concentration method using a thin film evaporator, according to Examples 1-4, was much more effective. In particular, from the comparison of distillation capacity between Example 3 and Comparative Example 2, it was confirmed that the distillation capacity of Example 3, wherein a thin film evaporator was used, was 4.6-fold higher than that of Comparative Example 3 wherein a CSTR was used. The molecular weight changes before and after evaporation were smaller in the case of using a thin film evaporator to concentrate the organic silicate polymer solution, as shown in Examples 1-4, than in the case of using a rotary evaporator in Comparative Example 3. From the comparison of distillation capacity it was also confirmed that the methods of Examples 1-4 were more effective. In particular, from the comparison of distillation capacity between Example 3 and Comparative Example 3, it was confirmed that the distillation capacity was 5.4-fold higher in the case of using a thin film evaporator in Example 3 than in the case of using a rotary evaporator in Comparative Example 3.

Moreover, molecular weight changes of the solution which had been concentrated twice, according to the distillation in Examples 5 and 6 were similar to those of the solution of Comparative Example 4, but the distillation capacity according to Examples 5 and 6 was much higher, compared with that of Comparative Example 4. Specifically, from the comparison of distillation capacity between Example 5 and Comparative Example 4, it was confirmed that the distillation capacity was 5.6-fold higher when the thin film evaporator was used in Example 5 than when the CSTR was used in Comparative Example 4.

According to Examples 1-6, the distillation using a thin film evaporator has the advantages of easy control and simple operation attributed to continuous distillation. However, according to the conventional method using a completely stirred tank reactor (Comparative Examples 1, 2 and 4), which is a batch distillation device, or a rotary evaporator (Comparative Example 3), the compositions in the CSTR and in the reboiler of the rotary evaporator are changed as distillation continues. So, as distillation takes place, the pressure has to be continuously regulated, which is very inconvenient.

INDUSTRIAL APPLICABILITY

According to the present invention, a method for concentrating organic silicate polymer solution is provided in which distillation time is remarkably reduced owing to the short-term continuous distillation, physical property changes of the organic silicate polymer solution are minimized by inhibiting the reaction caused by heat by passing the solution through a thin film evaporator quickly, cake generation is not observed, indicating that the concentration is done effectively, manipulation is easy, and capacity is greatly enhanced.

Those skilled in the art will appreciate that the conceptions and specific embodiments disclosed in the foregoing description may be readily utilized as a basis for modifying or designing other embodiments for carrying out the same purposes as the present invention. Those skilled in the art will also appreciate that such equivalent embodiments do not depart from the spirit and scope of the invention as set forth in the appended claims.

The invention claimed is:

1. A method for concentrating organic silicate polymer solution, said method characterized by the distillation of an organic silicate polymer solution comprising an organic silicate in the range of 2 to 30 wt % and an organic solvent in the range of 70 to 98 wt % using an agitated thin film evaporator under low pressure with a jacket temperature in the range of 29 to 36° C.

2. The method for concentrating organic silicate polymer solution according to claim 1,
wherein the organic silicate polymer is prepared by hydrolysis and condensation of one or more silane compounds selected from a group consisting of a compound represented by Formula 1, a compound represented by Formula 2, a compound represented by Formula 3, and the organic solvent:

$$SiR^1_p R^2_{4-p}$$ [Formula 1]

wherein,
$R^1$ is independently H, F, aryl, vinyl, allyl, or unsubstituted or F-substituted $C_1$-$C_4$ straight or branched alkyl,
$R^2$ is independently acetoxy, hydroxy, or $C_1$-$C_4$ straight or branched alkoxy,
P is an integer from 0-2

$$R^3_q R^4_{3-q} Si\text{-}M\text{-}SiR^5_r R^6_{3-r}$$ [Formula 2]

wherein,
$R^3$ and $R^5$ are independently H, F, aryl, vinyl, allyl, or unsubstituted or F-substituted $C_1$-$C_4$ straight or branched alkyl,
$R^4$ and $R^6$ are independently acetoxy, hydroxy, or $C_1$-$C_4$ straight or branched alkoxy,
M is $C_1$-$C_3$ alkylene or phenylene,
q and r are independently integers from 0-2

$$R^7_n [SiO]_m R^8_{2m-n}$$ [Formula 3]

wherein,
$R^7$ is independently H, F, aryl, vinyl, allyl, or unsubstituted or F-substituted $C_1$-$C_4$ straight or branched alkyl,
$R^8$ is independently alkoxy, hydroxy, or —$(CH_2)_a SiR^9_b R^{10}_{3-b}$ ($R^9$ is independently H, F, aryl, vinyl, allyl, or unsubstituted or F-substituted $C_1$-$C_4$ straight or branched alkyl, $R^{10}$ is acetoxy, hydroxy, or unsubstituted or F-substituted $C_1$-$C_4$ straight or branched alkoxy, a is an integer from 1-6, and b is an integer from 0-2), and
n and m are independently integers from 3-10.

3. The method for concentrating organic silicate polymer solution according to claim 1, wherein the distillation using the agitated thin film evaporator is performed under the low pressure of 0.001 torr-normal pressure.

4. The method for concentrating organic silicate polymer solution according to claim 1, wherein the distillation using the agitated thin film evaporator is performed one or more times.

5. The method for concentrating organic silicate polymer solution according to claim 1, wherein the concentrated organic silicate polymer solution can be applied to a composition for forming an insulating layer of a semiconductor device, a composition for a thin film, or a composition for multiple coating solutions.

* * * * *